United States Patent [19]

Boyer et al.

[11] Patent Number: 4,887,754

[45] Date of Patent: Dec. 19, 1989

[54] PORTABLE APPARATUS FOR RETAINING A BICYCLE

[75] Inventors: Scott M. Boyer, Valencia; Steven J. Cole, Arcata; Roger A. Gauvin, Saugus; Joe C. Mitchell, Canyon Country, all of Calif.

[73] Assignees: Answer Products, Inc., Valencia; Yakima, Inc., Arcata, both of Calif.

[21] Appl. No.: 253,768

[22] Filed: Oct. 5, 1988

[51] Int. Cl.$^4$ .............................................. B60R 9/00
[52] U.S. Cl. ..................................... 224/319; 211/11; 248/176; 248/229; 248/231.3
[58] Field of Search ............... 248/224, 127, 154, 176, 248/231.1, 231.3, 316.2; 211/17, 18, 22, 64; 224/319, 329, 42.46

[56] References Cited

U.S. PATENT DOCUMENTS

| | | | |
|---|---|---|---|
| 3,877,622 | 4/1975 | McLain | 211/22 X |
| 3,901,421 | 8/1975 | Kalicki et al. | 211/17 X |
| 4,116,341 | 9/1978 | Hebda | 224/42.46 R X |
| 4,343,404 | 8/1982 | Folsom | 211/17 |
| 4,728,244 | 3/1988 | Stokkendal | 224/319 X |

Primary Examiner—Ramon O. Ramirez
Attorney, Agent, or Firm—Thomas I. Rozsa

[57] ABSTRACT

A portable apparatus for retaining a bicycle in the manner of a conventional bicycle repair stand, and which can be used in conjunction with a conventional sports rack attached to the roof of a car or van. The apparatus can be attached to the conventional bicycle sports rack which is attached to the roof of a car and therefore utilizes the car and the sports rack as the supporting body framework to hold and support a bicycle in any desired orientation. The apparatus comprises an elongated member whose exterior cross-sectional dimensions are slightly smaller than the interior cross-sectional dimensions of the elongated base of a conventional sports rack attached to the roof of a vehicle, and is fitted into the interior section of the elongated base of the sports rack and retained therein by a press fit. Additional portions attached to the elongated section support a clamping mechanism which can retain a portion of a bicycle such as the horizontal tube of the frame.

24 Claims, 2 Drawing Sheets

PORTABLE APPARATUS FOR RETAINING A BICYCLE

FIELD OF THE INVENTION

In general, the present invention relates to the field of apparatus used as a work station for retaining objects which are being repaired, adjusted or otherwise worked on. The present invention relates to the field of accessories used to repair and adjust bicycles and more particularly to work stands and comparable retaining apparatus used to retain the frame of a bicycle in any multiplicity of orientations so that portions of the bicycle may be repaired or adjusted.

DESCRIPTION OF THE PRIOR ART

In general, work stands or bicycle repair stands are well known in the prior art. Conventional bicycle repair stands include a heavy duty metal frame which is supported on a base and has a vertically extending frame member terminating in a horizontally aligned supporting member designed to accommodate a clamping mechanism used to retain the central horizontal frame of the bicycle. Various modifications and adjustments to this work stand have been developed. In its simplest form, the stand is of simple metal construction, comprising a pair of tubular metal members which are horizontally oriented and spaced apart at their respective lowermost sections to provide a base support and thereafter are angularly aligned toward each other and come together at their uppermost portion, thereafter extending horizontally and generally parallel to the lowermost sections. The upper horizontally extending portions terminate in the clamping mechanism designed to retain the bicycle. The height of the apparatus is sufficient to handle a conventional racing bicycle or mountain bicycle to be supported in any orientation so that portions of the bicycle may be repaired or adjusted, and to also permit gears to be modified or changed.

More elaborate variations on bicycle repair stands include separate components for the lower supporting base, the vertically aligned section and the upper horizontally aligned section. The base may be of one piece construction and formed in a rectangle, a diamond, crossed in an "X" pattern, or any other configuration to provide stability. The base may include several suction pads to assure a more secure grip or may include wheels for rolling the stand from one location to another location. The vertically aligned section mating with the base member may be of one piece construction or may include one or more telescoping portions so that the height of the vertical section may be adjusted to accommodate bicycles of different sizes or to bring a specific portion of the bicycle into easier reach of the worker. The portion supporting the clamping mechanism is usually horizontally oriented and located at the uppermost portion of the vertical section. However, alternative embodiments wherein the supporting member is angularly oriented is also known in the prior art.

The upper horizontal section or angular section supports a clamp member which is usually spring-loaded and may be adjusted to any bicycle frame size. The clamp may be vinyl coated to protect the bicycle finish. The clamp may contain a lever system which allows the bicycle to be positioned anywhere within a full 360 degree rotation.

The bicycle stand may also include embellishments such as a tool tray.

Conventional bicycle stands are adequate for repairing and adjusting bicycles in the home workshop or in a factory environment. Conventional bicycle repair stands are heavy and bulky and are not easily portable from one location to another. Bicycle riding and bicycle racing are popular sports. Since the location of bicycle paths and the site of bicycle races is usually distant from the home or facility where the bicycle is stored, it is frequently necessary to transport the bicycle from one location to another. Conventional bicycle racks which removably attach to the rear of a car and conventional sports racks which are permanently affixed to the roof of a car, are well known. When transported by a conventional bicycle rack attached to the roof of a car, the bicycle is frequently jarred. While the amount of jarring may be insignificant for ordinary riders, bicycle racers must adjust the bicycle once they get to the site of a race since the jarring is sufficient to alter the sensitive setting in a racing bicycle. When the bicycle is attached to the sports rack of a car, one or both wheels are removed and must be replaced at the site of a race. In addition, depending on weather conditions, terrain, etc. the racers may decide to change gears and other features on the bicycle at the site of the race. Riders traversing hilly terrain such as mountain bike riders may also wish to adjust gears and other portions of the bicycle at the location of the ride before beginning the ride.

At the location where the ride begins, the rider usually props the bicycle up against the car or van in which the bicycle was brought or against a fence, and makes adjustments. This is both inconvenient and cumbersome. Since conventional work repair stands are heavy and bulky, they are difficult to transport and therefore usually not bought to the site where the ride begins. Therefore, a significant need exists for an apparatus which can operate in the manner of the conventional bicycle repair stand and be easily transported in a vehicle to the site where the bicycle ride begins.

SUMMARY OF THE PRESENT INVENTION

The present invention is a portable apparatus for retaining a bicycle in the manner of a conventional bicycle repair stand, and which can be used in conjunction with a conventional sports rack attached to the roof of a car or van. The present invention is an apparatus which can be attached to the conventional bicycle sports rack which is attached to the roof of a car and therefore utilizes the car and the sports rack as the supporting body framework to hold and support a bicycle in any desired orientation.

It has been discovered, according to the present invention, that if an apparatus, comprising an elongated member whose exterior cross-sectional dimensions are slightly smaller than the interior cross-sectional dimensions of the elongated base of a conventional sports rack attached to the roof of a vehicle, is fitted into the interior section of the elongated base of the sports rack and retained therein by a press fit, then the apparatus can utilize the body of the vehicle as the supporting stand to counterbalance and retain a bicycle thereon.

It has been further discovered, according to the present invention, that if the cross-section of the elongated base of the sports rack is circular, and the cross-section of the elongated member of the present invention bicycle retaining apparatus is circular, and the member is cylindrical, hollow and contains a plug member which can be caused to move into the elongated member and expand its diameter adjacent one end, then the plug member can expand the diameter sufficiently to form a press fit of the elongated member within the sports rack base, to thereby assure that the two will be firmly engaged.

It has been additionally discovered, according to the present invention, that if the cross-section of the elongated base of the sports rack is rectangular or square, and the cross-section of elongated member of the present invention portable bicycle retaining apparatus is rectangular or square, and is also hollow and contains a pair of plug members which can be caused to move into the elongated member and which plug member sections can move relative to one another and expand the diameter of the elongated member adjacent one end, then the pair of plug members can expand the diameter sufficiently to form a press fit of the elongated member within the sports rack base, to thereby assure that the two will be firmly engaged.

It has further been discovered, according to the present invention, that if the portable bicycle retaining apparatus further comprises a section for retaining a conventional clamping apparatus, which section is offset from the elongated retaining section, then the apparatus can be used to retain a bicycle thereon at a location sufficiently remote from the vehicle to permit the bicycle to be rotated to any desired location to be worked on while the vehicle provides the counterbalance support and member for retaining the bicycle in a vertical position comparable to a conventional bicycle repair stand.

It is therefore an object of the present invention to provide a portable bicycle retaining apparatus which can be easily transported to the location of a bicycle ride and removably attached to the vehicle in or on which the bicycle was transported.

It is another object of the present invention to provide a portable bicycle retaining apparatus which can retain the bicycle on a vehicle in a manner such that the bicycle is sufficiently distant from the vehicle to permit the bicycle to be rotated into any desired orientation with complete access to any location of the bicycle so that the bicycle can be repaired, adjusted and worked on in any desired manner.

It is a further object of the present invention to provide an apparatus which can be removably fit into the base of a conventional sports rack and removably retained therein such that the apparatus can use the vehicle as a counterbalancing force and support structure to take the place of a conventional bicycle repair stand for retaining a bicycle at a remote location such as adjacent a bicycle path or bicycle racing location.

Further novel features and other objects of the present invention will become apparent from the following detailed description, discussion and the appended claims.

DRAWING SUMMARY

Referring particularly to the drawings for the purpose of illustration only and not limitation, there is illustrated:

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
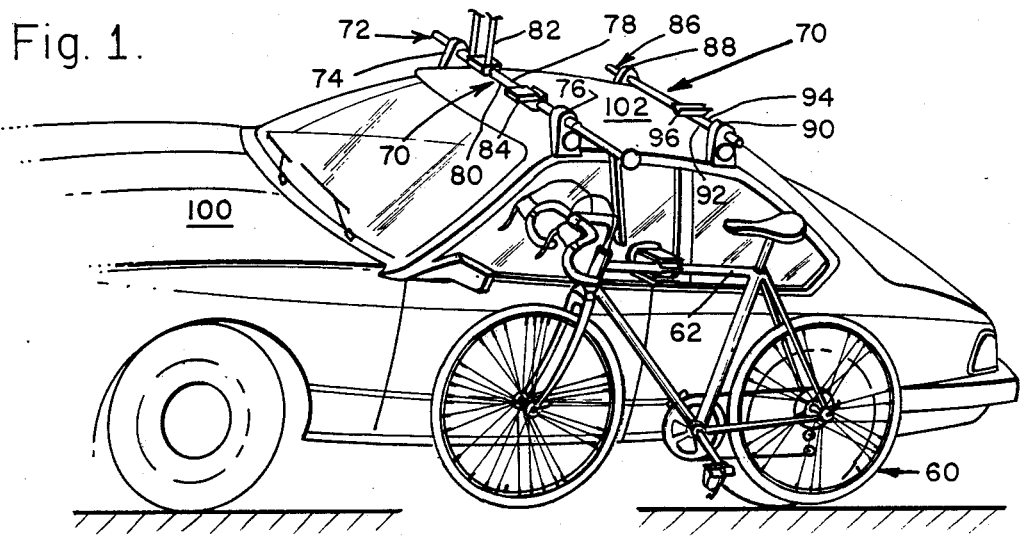
FIG. 1 is a perspective view of a vehicle with a sports rack attached to its roof and the present invention portable bicycle retaining apparatus retained within the sports rack and supporting a bicycle.

Referring particularly to FIG. 1, there is illustrated a vehicle with a sports rack attached to its roof and the present invention portable bicycle retaining apparatus retained within the sports rack and supporting a bicycle. The vehicle 100 illustrated is an automobile, but it will be appreciated that any other vehicle such as a van or consumer truck which has a roof capable of accommodating a sports rack can be used with the present invention. A sports rack 70 is affixed to the roof. The sports rack 70 comprises two sections, a first section 72 and a second section 86. The first section 72 has a pair of attachment blocks 74 and 76 attached to opposite sides of the roof 102 of vehicle 100 closest to the front of the vehicle. The attachment blocks or posts 74 and 76 support an elongated hollow rod 78 which supports on its external surface 80 a multiplicity of attachment apparatus, two of which are illustrated as a bicycle post 82 and a wheel clamp 84. The elongated hollow rod 78 of sports rack 70 is sealed at one end and is openable at its other end through a removable end cap which can be removed to expose the hollow interior of elongated hollow rod 78. The second section 86 also has a pair of attachment blocks 88 and 90 attached to opposite sides of the roof 102 of vehicle 100, and located closest the rear of the vehicle, thereby spaced apart from the first pair of attachment blocks 74 and 76. The attachment blocks or posts 88 and 90 support an elongated hollow rod 92 which supports on its external surface 94 a multiplicity of attachment apparatus, one of which is illustrated as a wheel clamp 96. This elongated hollow rod 92 of sports rack 70 is sealed at end and may also be openable at its other end through a removable end cap which can be removed to expose the hollow interior of elongated hollow rod 92. It will be appreciated that the rods 78 and 92 of sports rack 70 can be used to support other attachment apparatus such as ski attachments, dirt bike attachments, etc. For purposes of the present invention, the important feature of the conventional sports rack is the hollow elongated rods 78 and/or 92 which will be used for a support purpose not used in the prior art devices.

Figure 2:
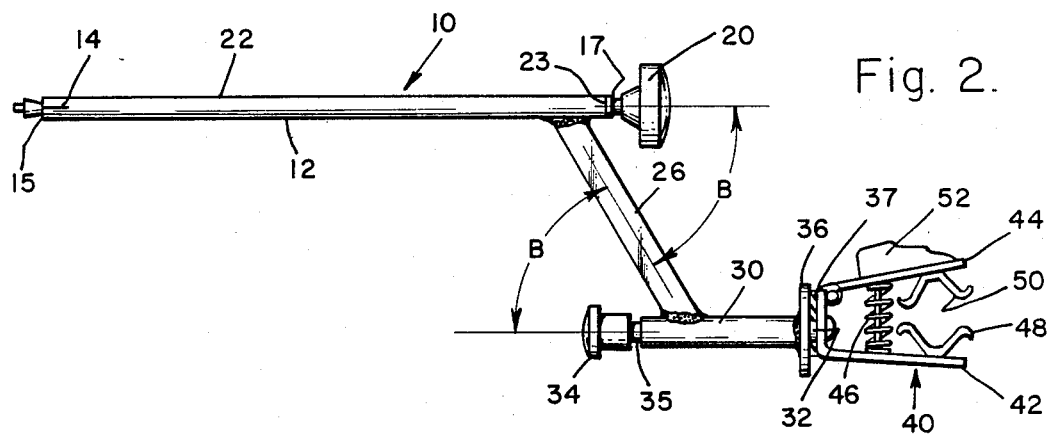
FIG. 2 is a side elevational view of the present invention apparatus for retaining a bicycle.
Figure 4:
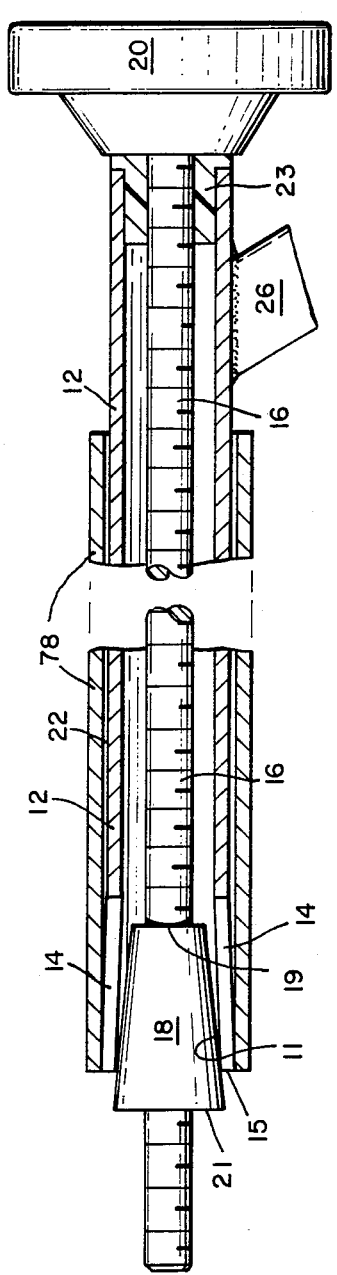
FIG. 4 is a partial cross-sectional view of one Embodiment of the present invention portable apparatus for retaining a bicycle, with the elongated section having a circular cross section.

The present invention portable bicycle attachment apparatus 10 is illustrated in the side elevational view of FIG. 2. The portable bicycle attachment apparatus 10 comprises an upper elongated hollow rod 12 which contains at least one and preferably a multiplicity of splits 14 in the surface 22 adjacent one end 15 so that the diameter of the rod 12 at this end 15 can be expanded through insertion of a wider object into the rod 12. In one embodiment illustrated in FIGS. 2 and 4, the upper elongated hollow rod 12 is cylindrical. Referring to FIGS. 4 and 2, the upper elongated hollow rod 12 further comprises an internal threaded solid rod 16 which supports a plug member 18 which is adjacent to the end 15 of the upper elongated hollow rod 12 containing the splits 14 in its surface 22. The plug member 18 is preferably in the shape of a frustum, with its small end 19 located adjacent the opening 11 at end 15 of upper elongated hollow rod 12. The wider end 21 of frustum shaped plug 18 lies outside upper elongated hollow rod 12. A handle 20 is located just outside the opposite end of the upper elongated hollow rod 12 and attached to internal threaded solid rod 16. The plug member 18 is threadably secured to the internal threaded solid rod 16 and by rotation of handle 20 in one direction (such as counterclockwise), the plug member 18 can be rotatably moved along rod 16 and toward handle 20, thereby causing wider portions of the plug member 18 to enter the upper elongated hollow rod 12 at the location of its opening 11. As the frustum shaped plug member 18 moves into the upper elongated hollow rod 12, the rod 12 can expand inside due to the various splits 14 in its surface which permit the wider portions of the plug to enter the rod, thereby expanding the diameter of this end 15 of rod 12. Adjacent the end of the elongated hollow rod 12 opposite the location of the plug member 18 is an internal support plug 23 which is located within elongated hollow rod 12 and surrounded internal threaded solid rod 16. The internal support plug 23 is made of flexible material to provide some support for the internal threaded solid rod 16 to counterbalance the plug member 18. An alternative expansion means for rods 12 which are not cylindrical will be discussed later on.

Figure 3:
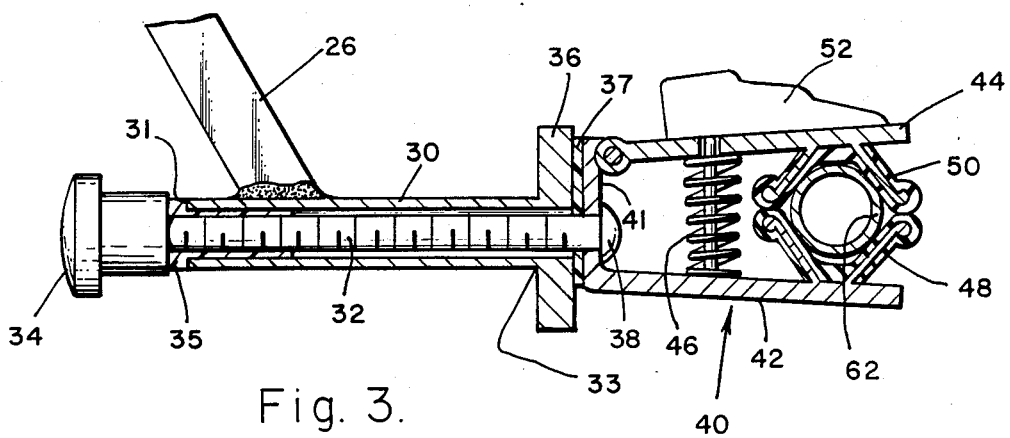
FIG. 3 is a partial cross-sectional view of the present invention apparatus for retaining a bicycle, showing the spring loaded clamp retaining a section of the bicycle.

Attached to the surface 22 of upper elongated hollow rod 12 adjacent its end 17 (adjacent handle 20) is a transverse separation member 26 which serves to attach upper elongated hollow rod 12 to lower hollow rod 30. Referring to FIG. 3, lower hollow rod 30 comprises can internal threaded rod 32, having a handle 34 at one end 35 adjacent end 31 of lower hollow rod 30. Lower hollow rod 30 terminates in a transverse plate 36 at its opposite end 33. Transverse plate 36 is in turn attached to a spacer and gripping member 37. Internal threaded rod 32 extends through the transverse plate 36 and spacer and gripping member 37, and rotatably attaches to a clamp 40. Clamp 40 can be of numerous conventional clamp embodiments. The embodiment illustrated in FIGS. 2 and 3 has a fixed jaw 42 and a hinged movable jaw 44 which are kept open by a spring 46 separating the two jaws. Fixed jaw 42 further comprises a lower clamp jaw 48 and movable jaw 44 further comprises an upper clamp jaw 50 oppositely disposed to lower clamp jaw 48. Through a closing mechanism 52, the force of the spring is overcome and the movable jaw 44 is forced toward the fixed jaw 42, thereby forcing the lower clamp jaw 48 and upper clamp jaw 50 together. As illustrated in FIGS. 1 and 3, a portion of a bicycle 60, such as the upper bar 62 can be firmly held between the two clamp jaws. The clamp jaws may be vinyl coated to protect the bicycle finish. The clamp 40 may contain a lever system in addition to the rotatable handle 34 to further permit the bicycle 60 to be positioned anywhere within a full 360 degree rotation. It will be appreciated that numerous other types of clamping mechanisms can be used in place of the one illustrated and are certainly within the spirit and scope of the present invention. For example, both jaws of the clamping mechanism can be movable and may be kept open by means other than a spring mechanism. In addition, the rear 41 of fixed jaw 42 may also contain a plate which lies adjacent transverse plate 36 of lower hollow rod 30 to thereby provide a better grip between the lower hollow rod 30 and the clamp 40.

The present invention portable bicycle retaining apparatus 10 is shown in use in FIG. 1. The end cap of elongated hollow rod 78 of sports rack 70 is removed to exposed its hollow interior. Upper elongated hollow rod 12, having a cross section slightly smaller than the interior cross section of elongated hollow rod 78 is inserted into elongated hollow rod 78 and pushed into it for most of the length of upper elongated hollow rod 12 until transverse separation section 26 lies adjacent the opening of elongated hollow rod 78. Handle 20 is then caused to rotate so that plug member 18 is caused to move into upper elongated hollow rod 12 as previously described, thereby causing the rod 12 to expand adjacent its opening 11. The expansion of the upper elongated hollow rod 12 creates a press fit between the exterior surface 22 adjacent end 11 of upper elongated hollow rod 12 and the interior of elongated hollow rod 78 of sports rack 70. By way of example only, the length of upper elongated hollow rod 12 may be two feet and the distance between the location of transverse separation section 26 and opening 11 may be twenty (20) inches. Therefore, a substantial portion of upper elongated hollow rod 12 lies within elongated hollow rod 78 and the press fit is at the innermost portion of the upper elongated hollow rod 12. As a result, the vehicle 100 can provide a strong counterbalancing force for any object affixed to the end of upper elongated hollow rod 12 lying outside elongated hollow rod 78. The clamp 40 is opened in a conventional manner and the desired portion of the bicycle 60, most commonly the upper central tube 62 of the bicycle frame, is inserted between clamp jaws 48 and 50 and the clamp is closed to secure the portion of the bicycle. The handle 34 can be rotated in one direction to cause threaded rod 32 to rotate and separate the rear 41 of clamp 40 from spacer and gripping member 37 and transverse plate 36, thereby permitting clamp 40 to be rotated in order to orient the attached bicycle 60 at the desired orientation for the section to be worked on. The handle 34 can then be rotated to draw the clamp 40 tightly against transverse plate 36 to secure the clamp 40 in this orientation. As illustrated in FIG. 2, the transverse separation section is angularly disposed between upper hollow elongated rod 12 and lower hollow rod 30 so that the clamp 40 extends far enough away from the vehicle 100 to provide sufficient clearance to easily rotate the bicycle 60. By way of example, the length of transverse separation section 26 may be eight (8) inches and the length of lower hollow rod 30 may be one (1) foot. The angle "B" of transverse separation section 26 to the horizontal may range between approximately thirty (30) degrees and approximately sixty (60) degrees, with approximately forty-five (45) degrees being the preferred angle.

The parts of the portable bicycle retaining apparatus 10 are preferably made of steel, but can also be made of other strong light weight metals such as aluminum or titanium.

Figure 5:
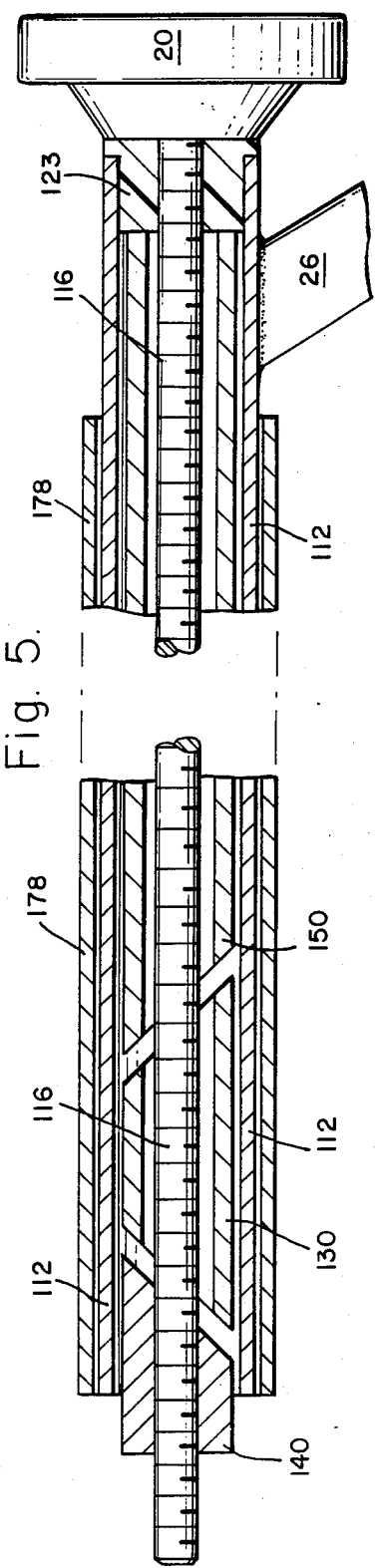
FIG. 5 is a partial cross-sectional view of an alternative embodiment of the present invention portable apparatus for retaining a bicycle, with the elongated section having a rectangular cross section.

The hollow elongated rod 78 or sports rack 70 may also be configured with multiple plug members which move relative to one another instead of the single plug member. In this embodiment, the cross-section of the elongated hollow rod of the sports rack and the upper elongated hollow rod of the present invention bicycle retaining apparatus can be circular, or also can be of a rectangular or square cross-section rather than a circular cross section. Such a configuration is illustrated in FIG. 5. The alternative embodiment hollow elongated sports rack 178 is illustrated in FIG. 5. The end cap of elongated hollow rod 178 of sports rack 70 is removed to exposed its hollow interior. Upper elongated hollow rod 112, having a cross section slightly smaller than the interior cross section of elongated hollow rod 178 is inserted into elongated hollow rod 178 and pushed into it for most of the length of upper elongated hollow rod 112 until transverse separation section 26 lies adjacent the opening of elongated hollow rod 178. In this alternative embodiment bicycle sports rack apparatus, there is the central threaded rod supporting three plug members which directly come in contact with the interior wall of upper elongated hollow rod 112. In this embodiment, the three plug member sections, 130, 140 and 150 are mounted on threaded internal rod 116. The rod 116 terminates in a handle 20 at the end remote from the three plug member sections 130, 140 and 150. The plug touching surfaces of plug members 130, 140 and 150 are slanted in opposite directions as shown in FIG. 5 to facilitate sliding lateral movement of adjacent plugs relative to one another. Plug member 140 which is farthest from handle 20 is preferably solid and cannot move relative to plug members 130 and 150 but can rotatably move along internal threaded rod 116. Central plug member 130 which is hollow can move transversely relative to plug members 140 and 150 and also transversely relative to internal threaded rod 16. Innermost plug member 150 is also hollow and can move transversely relative to plug members 130 and 140 and also relative to internal threaded rod 116. Filler plug 123 is located adjacent handle 20 so that threaded rod 116 will be counterbalanced within elongated hollow rod 112 relative to the three plug members 130, 140 and 150. Upper elongated hollow rod 112, having a cross section slightly smaller than the interior cross section of elongated hollow rod 178 is inserted into elongated hollow rod 178 and pushed into it for most of the length of upper elongated hollow rod 112 until transverse separation section 26 lies adjacent the opening of elongated hollow rod 178. Handle 20 is then caused to rotate so that plug member 140 moves inwardly into elongated hollow rod 112 and as it comes in contact with hollow plug member 130, it causes hollow plug member 130 to move longitudinally toward plug member 150 and also laterally relative to plug member 140 and to internal threaded rod 116. As further turning of handle 20 cause more movement of plug 140 further into the elongated hollow rod 112, hollow plug member 130 comes in contact with hollow plug member 150 which is also caused to move laterally relative to plug members 130 and 140 and also relative to internal threaded rod 116. Plug member 150 has a restraining means at its inwardmost location to prevent it from moving longitudinally further along internal threaded rod 112. As the three plug members are forced together, the relative lateral movement of plug members 130 and 150 which have angled mating surfaces as shown so that the plugs can easily move in a lateral direction relative to each other and to the internal threaded rod 112 come in contact with the internal surface of the wall of elongated hollow rod 112 and cause it to expand in cross section so that this area of the wall of elongated hollow rod 112 presses against the interior of the elongated hollow rod 178 of the sports rack. By way of example, innermost hollow plug 150 moves downwardly while central hollow plug 130 moves upwardly.

Figure 6:
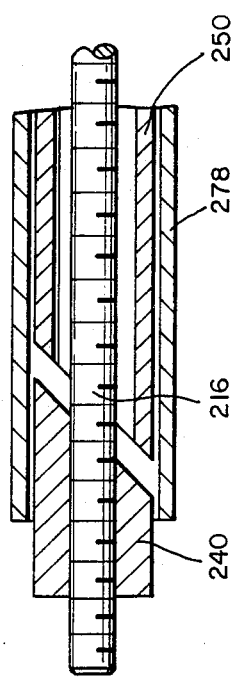
FIG. 6 is a partial cross-sectional view of a second embodiment of the alternative embodiment of the present invention portable apparatus for retaining a bicycle, with the elongated section having a rectangular cross section.

While the preferred alternative embodiment comprises three plug members 130, 140 and 150 as described above, a simpler modified version of the alternative embodiment having only two such plug members is also within the spirit and scope of the present invention. This is illustrated in FIG. 6. Once again, the cross-section of the elongated hollow rod of the sports rack can be circular, square or rectangular and the cross-section of the upper elongated hollow rod of the present invention can also be similarly configured in circular, square or rectangular, and having a cross-sectional size slightly smaller than the interior cross-section of the elongated hollow rod of the sports rack. As with the preferred alternative embodiment illustrated in FIG. 5, the outermost plug member 240 is solid and can rotatably move longitudinally along internal threaded rod 216. The interiormost plug member 250 is hollow and can move laterally relative to plug member 240 and also laterally or transversely relative to internal threaded rod 216. Hollow plug member 250 is restrained from moving inwardly further along internal threaded rod 216. The plugs are located within upper elongated hollow rod 278. In all other respects, the apparatus is the same as that described for FIG. 5. The upper elongated hollow rod 278 is inserted into the elongated hollow rod of the sports rack as previously described and handle 20 is rotated to cause plug member 240 to move toward plug member 250 until their mating slanted surfaces come in contact with one another, thereby causing plug member 250 to move laterally relative to plug member 240 and relative to plug member 250 until its surface comes in contact with the surface of upper elongated hollow rod 278 which in turn is caused to bow out and press against the interior of the elongated hollow rod of the sports rack, thereby creating the press fit. This embodiment with only two plug members works better for square and rectangular cross-sections rather than circular cross-sections.

While the most common cross-sectional configurations for the elongated hollow rod forming the base of the sports rack is either circular for a cylindrical rod or rectangular or square, it is possible that other configurations such as oval may become popular. It will be appreciated that the present invention is intended to encompass such other configurations by making the configuration of the upper elongated hollow rod comparable in cross section and slightly smaller in cross section than the interior of the elongated hollow rod of the sports rack so that the upper elongated hollow rod the portable bicycle retaining apparatus can be inserted into the elongated hollow rod of the sports rack and a press fit created adjacent its interiormost end.

After the adjustments and repairs to the bicycle have been made, the bicycle 60 can be removed from the portable bicycle retaining apparatus 10 by opening the clamp 40 and removing the bicycle. The handle 20 can then be rotated so that plug member 18 is caused to rotate back outside the end 115 of upper elongated hollow rod 12 (or plugs 130, 140 and 150 are separated so that the dimension of upper elongated hollow rod 112 is returned to its original dimension or plugs 240 and 250 are separated so that the dimension of upper elongated hollow rod 278 is returned it its original dimension) and the upper elongated hollow rod 12 (or 112) is removed from the interior of elongated hollow rod 78 (or 178) of sports rack 70. The portable bicycle retaining apparatus can then be stowed in the trunk of the vehicle or on the rear seat until it is needed once again.

Therefore, through use of the present invention, the rider of a bicycle can have a single and portable device which can be brought to the site of the bicycle ride or bicycle race and used in conjunction with the sports rack already on the vehicle to create a bicycle mounting stand for efficiently and simply supporting a bicycle in any desired orientation so that repairs can be made, gears can be changed or adjusted, etc.

Defined more broadly, the present invention is an apparatus to be used in conjunction with a sports rack attached to the roof of a vehicle, the sports rack having at least one elongated hollow rod, the apparatus to be used for retaining a bicycle, comprising: (a) an upper elongated hollow rod having an exterior cross section smaller than the interior cross section of the at least one elongated hollow rod of said sports rack and capable of insertion into said at least one elongated hollow rod of sports rack; (b) the surface of the upper elongated hollow rod having at least one split adjacent one end and capable of having its exterior cross section expanded to a larger cross section at the location of the at least one split; (c) a plug member located adjacent the end of said upper elongated hollow rod having said at least one split and capable of insertion into said upper elongated hollow rod to thereby increase the cross section of the upper elongated hollow rod at the location of said at least one split; (d) means for drawing said plug member into said upper elongated hollow rod; (e) a lower elongated rod rotatably attached to a clamping means at one end, the clamping means having clamps for retaining a bicycle; and (f) a transverse separation member connecting said upper elongated hollow rod to said lower elongated rod in a manner wherein said lower elongated rod is spaced apart from said upper elongated hollow rod and said clamping means is positioned away from the vehicle when said upper elongated hollow rod is inserted into and retained within said at least one elongated hollow rod of said sports rack; (g) whereby said upper elongated hollow rod may be inserted into said at least one elongated hollow rod of said sports rack and secured therein by a press fit formed from the expansion of one end of said upper elongated hollow rod when said plug member is caused to be inserted into it, and said clamping means can be attached to a portion of a bicycle for supporting the bicycle.

The transverse separation member is located adjacent the end of said upper elongated hollow rod away from the end having said at least one split and is aligned at an angle relative to said upper elongated hollow rod and at an angle relative to said lower elongated rod to thereby cause said lower elongated rod to extend below and away from the upper elongated hollow rod and the clamping means is positioned at the end of said lower elongated rod farthest from the end of said upper elongated hollow rod having the at least one split in its surface.

The angle between said upper elongate hollow rod and said transverse separation member is the range of approximately 30 degrees to approximately 60 degrees and the angle between said lower elongated rod and said transverse separation member is in the range of approximately 30 degrees to approximately 60 degrees.

In the embodiment where the cross section of said at least one elongated hollow rod of said sports rack is circular, the cross section of said upper elongated hollow rod is circular and said plug member is in the shape of a frustum with the narrow end closest to the end of the upper elongated hollow rod having the at least one split in its surface.

The plug member is threaded onto an internal threaded rod extending through the interior of said upper elongated hollow rod and a handle member is attached to the internal threaded rod adjacent to end of said upper elongated hollow rod remote from the end having said at least one split in its surface.

The lower elongated rod is hollow, has a threaded rod extending through it, and the threaded rod is attached to a handle adjacent the end of the lower elongated rod closest to the end of said upper elongated hollow rod having the at least one split in its surface and the threaded rod is attached to the clamping means adjacent the end of said lower elongated rod farthest from the end of said upper elongated hollow rod having the at least one split in its surface.

Defined even more broadly, the present invention is an apparatus to be used in conjunction with a sports rack attached to the roof of a vehicle, the sports rack having at least one elongated hollow rod, the apparatus to be used for retaining a bicycle, comprising: (a) first attachment means for removably attaching the apparatus to the sports rack on said vehicle through insertion of the first attachment means into said at least one elongated hollow rod of said sports rack and removably retaining it therein; (b) second attachment means for rotatably retaining a clamping means having clamps for retaining a bicycle; and (c) transverse attachment means by which said first attachment means is connected to said second attachment means in a manner wherein said clamping means is positioned away from the vehicle when said first attachment means is inserted into and retained within said at least one elongated hollow rod of said sports rack.

In the embodiment where the cross section of said at least one elongated hollow rod of said sports rack is circular, said first attachment means further comprises: (a) an upper elongated hollow rod having a generally circular exterior cross section smaller than the interior cross section of the at least one elongated hollow rod of said sports rack and capable of insertion into said at least elongated hollow rod of sports rack; (b) the surface of the upper elongated hollow rod having at least one split adjacent one end and capable of having its exterior cross section expanded to a larger cross section at the location of the at least one split; (c) a plug member located adjacent the end of said upper elongated hollow rod having said at least one split and capable of insertion into said upper elongated hollow rod to thereby increase the cross section of the upper elongated hollow rod at the location of said at least one split; and (d)

means for drawing said plug member into said upper elongated hollow rod.

In this embodiment, the plug member is in the shape of a frustum with the narrow end closest to the end of the upper elongated hollow rod having the at least one split in its surface.

In the embodiment where the cross-section of said at least one elongated hollow rod of said sports rack is generally rectangular, said first attachment means further comprises: (a) an upper elongated hollow rod having a generally rectangular exterior cross-section smaller than the interior cross-section of the at least one elongated hollow rod of said sports rack and capable of insertion into said at least one elongated hollow rod of said sports rack; (b) the surface of the upper elongated hollow rod adjacent one end which is inserted into said at least one elongated hollow rod of said sports rack capable of having its exterior cross-section expanded to a larger cross section adjacent the location of the end; (c) two plug members located adjacent the end of said upper elongated hollow rod with one plug member located within the upper elongated hollow rod and the second plug member having a portion outside the upper elongated hollow rod and capable of insertion into said upper elongated hollow rod; and (d) means for drawing said plug member having a portion outside said upper elongated hollow rod into said upper elongated hollow rod to cause the two plug members to come together and to have at least one of the plug members move transversely relative to the other plug member to thereby increase the cross-section of the upper elongated hollow rod at the location where the plugs spread transversely relative to each other.

In this embodiment, (a) said means for drawing the plug member into the upper elongated hollow rod is an internal threaded rod extending through the interior of said upper elongated hollow rod and threaded into the plug member having a portion outside the upper elongated hollow rod; (b) said plug member located within the upper elongated hollow rod is hollow and can move relative to the internal threaded rod; and (c) the internal threaded rod has a handle member attached to the internal threaded rod adjacent to end of said upper elongated hollow rod remote from the location of the two plug members.

In the embodiment where the cross-section of said at least one elongated hollow rod of said sports rack is generally square, said first attachment means further comprises: (a) an upper elongated hollow rod having a generally square exterior cross-section smaller than the interior cross section of the at least one elongated hollow rod of said sports rack and capable of insertion into said at least one elongated hollow rod of said sports rack; (b) the surface of the upper elongated hollow rod adjacent one end which is inserted into said at least one elongated hollow rod of said sports rack capable of having its exterior cross-section expanded to a larger cross section adjacent the location of the end; (c) two plug members located adjacent the end of said upper elongated hollow rod with one plug member located within the upper elongated hollow rod and the second plug member having a portion outside the upper elongated hollow rod and capable of insertion into said upper elongated hollow rod; and (d) means for drawing said plug member having a portion outside said upper elongated hollow rod into said upper elongated hollow rod to cause the two plug members to come together and to have at least one of the plug members move transversely relative to the other plug member to thereby increase the cross-section of the upper elongated hollow rod at the location where the plugs spread transversely relative to each other.

In this embodiment, (a) said means for drawing the plug member into the upper elongated hollow rod is an internal threaded rod extending through the interior of said upper elongated hollow rod and threaded into the plug member having a portion outside the upper elongated hollow rod; (b) said plug member located within the upper elongated hollow rod is hollow and can move relative to the internal threaded rod; and (c) the internal threaded rod has a handle member attached to the internal threaded rod adjacent to end of said upper elongated hollow rod remote from the location of the two plug members.

In the embodiment where cross section of said at least one elongated hollow rod of said sports rack is generally circular, said first attachment means further comprises: (a) an upper elongated hollow rod having a generally circular exterior cross-section smaller than the interior cross-section of the at least one elongated hollow rod of said sports rack and capable of insertion into said at least one elongated hollow rod of said sports rack; (b) the surface of the upper elongated hollow rod adjacent one end which is inserted into said at least one elongated hollow rod of said sports rack capable of having its exterior cross-section expanded to a larger cross section adjacent the location of the end; (c) two plug members located adjacent the end of said upper elongated hollow rod with one plug within the upper elongated hollow rod and the second plug member having a portion outside the upper elongated hollow rod and capable of insertion into said upper elongated hollow rod; and (d) means for drawing said plug member having a portion outside said upper elongated hollow rod into said upper elongated hollow rod to cause the two plug members to come together and to have at least one of the plug members move transversely relative to the other plug member to thereby increase the cross-section of the upper elongated hollow rod at the location where the plugs spread transversely relative to each other.

In this embodiment, (a) said means for drawing the plug member into the upper elongated hollow rod is an internal threaded rod extending through the interior of said upper elongated hollow rod and threaded into the plug member having a portion outside the upper elongated hollow rod; (b) said plug member located within the upper elongated hollow rod is hollow and can move relative to the internal threaded rod; and (c) the internal threaded rod has a handle member attached to the internal threaded rod adjacent to end of said upper elongated hollow rod remote from the location of the two plug members.

In the embodiment where the cross-section of said at least one elongated hollow rod of said sports rack is generally circular, said first attachment means further comprises: (a) an upper elongated hollow rod having a generally circular exterior cross-section smaller than the interior cross-section of the at least one elongated hollow rod of said sports rack and capable of insertion into said at least one elongated hollow rod of said sports rack; (b) the surface of the upper elongated hollow rod adjacent one end which is inserted into said at least one elongated hollow rod of said sports rack capable of having its exterior cross-section expanded to a larger cross section adjacent the location of the end; (c) three plug members located adjacent the end of said upper elongated hollow rod with two plug members located within the upper elongated hollow rod and the third plug member having a portion outside the upper elongated hollow rod and capable of insertion into said upper elongated hollow rod; and (d) means for drawing the third plug member having a portion outside said upper elongated hollow rod into said upper elongated hollow rod to cause the three plug members to come together and to have the two plug members located within the upper elongated hollow rod move transversely relative to each other and relative to the third plug member to thereby increase the cross-section of the upper elongated hollow rod at the location where the plugs spread transversely relative to each other.

In this embodiment, (a) said means for drawing the third plug member into the upper elongated hollow rod is an internal threaded rod extending through the interior of said upper elongated hollow rod and threaded into the third plug member having a portion outside the upper elongated hollow rod; (b) the two plug members located within the upper elongated hollow rod are hollow and each can move relative to the internal threaded rod; and (c) the internal threaded rod has a handle member attached to the internal threaded rod adjacent to end of said upper elongated hollow rod remote from the location of the three plug members.

In the embodiment where the cross-section of said at least one elongated hollow rod of said sports rack is generally rectangular, said first attachment means further comprises: (a) an upper elongated hollow rod having a generally rectangular exterior cross-section smaller than the interior cross-section of the at least one elongated hollow rod of said sports rack and capable of insertion into said at least one elongated hollow rod of said sports rack; (b) the surface of the upper elongated hollow rod adjacent one end which is inserted into said at least one elongated hollow rod of said sports rack capable of having its exterior cross-section expanded to a larger cross section adjacent the location of the end; (c) three plug members located adjacent the end of said upper elongated hollow rod with two plug members located within the upper elongated hollow rod and the third plug member having a portion outside the upper elongated hollow rod and capable of insertion into said upper elongated hollow rod; and (d) means for drawing the third plug member having a portion outside said upper elongated hollow rod into said upper elongated hollow rod to cause the three plug members to come together and to have the two plug members located within the upper elongated hollow rod move transversely relative to each other and relative to the third plug member to thereby increase the cross-section of the upper elongated hollow rod at the location where the plugs spread transversely relative to each other.

In this embodiment, (a) said means for drawing the third plug member into the upper elongated hollow rod is an internal threaded rod extending through the interior of said upper elongated hollow rod and threaded into the third plug member having a portion outside the upper elongated hollow rod; (b) the two plug members located within the upper elongated hollow rod are hollow and each can move relative to the internal threaded rod; and (c) the internal threaded rod has a handle member attached to the internal threaded rod adjacent to end of said upper elongated hollow rod remote from the location of the three plug members.

In the embodiment where the cross-section of said at least one elongated hollow rod of said sports rack is generally square, said first attachment means further comprises: (a) an upper elongated hollow rod having a generally square exterior cross-section smaller than the interior cross-section of the at least one elongated hollow rod of said sports rack and capable of insertion into said at least one elongated hollow rod of said sports rack; (b) the surface of the upper elongated hollow rod adjacent one end which is inserted into said at least one elongated hollow rod of said sports rack capable of having its exterior cross-section expanded to a larger cross section adjacent the location of the end; (c) three plug members located adjacent the end of said upper elongated hollow rod with two plug members located within the upper elongated hollow rod and the third plug member having a portion outside the upper elongated hollow rod and capable of insertion into said upper elongated hollow rod; and (d) means for drawing the third plug member having a portion outside said upper elongated hollow rod into said upper elongated hollow rod to cause the three plug members to come together and to have the two plug members located within the upper elongated hollow rod move transversely relative to each other and relative to the third plug member to thereby increase the cross-section of the upper elongated hollow rod at the location where the plugs spread transversely relative to each other.

In this embodiment, (a) said means for drawing the third plug member into the upper elongated hollow rod is an internal threaded rod extending through the interior of said upper elongated hollow rod and threaded into the third plug member having a portion outside the upper elongated hollow rod; (b) the two plug members located within the upper elongated hollow rod are hollow and each can move relative to the internal threaded rod; and (c) the internal threaded rod has a handle member attached to the internal threaded rod adjacent to end of said upper elongated hollow rod remote from the location of the three plug members.

The first attachment means discussed above may further comprise an upper elongated hollow rod having two ends of which one end is inserted into the elongated hollow rod of the sports rack and the other end remains outside the elongated hollow rod of the sports rack and said transverse attachment means by which said first attachment means is connected to said second attachment means is located adjacent the end of said upper elongated hollow rod outside the elongated hollow rod of the sports rack and is aligned at an angle relative to said upper elongated hollow rod and at an angle relative to said second attachment means to thereby cause said second attachment means to extend below and away from the upper elongated hollow rod and the clamping means is positioned at the end of said second attachment means farthest from the end of said upper elongated hollow rod inserted into the elongated hollow rod of the sports rack.

Said angle between said upper elongated hollow rod and said transverse separation member is the range of approximately 30 degrees to approximately 60 degrees and the angle between said second attachment means and said transverse separation member is in the range of approximately 30 degrees to approximately 60 degrees.

The first attachment means discussed above may further comprise an upper elongated hollow rod having two ends of which one end is inserted into the elongated hollow rod of the sports rack and the other end remains outside the elongated hollow rod of the sports rack and said second attachment means is an elongated hollow rod having a threaded rod extending through it, and the threaded rod is attached to a handle adjacent the end of the elongated rod closest to the end of said upper elongated hollow rod which is inserted into the elongated hollow rod of the sports rack and the threaded rod is attached to the clamping means adjacent the end of said elongated rod farthest from the end of said upper elongated hollow rod which is inserted into the elongated hollow rod of the sports rack.

Of course the invention is not intended to be restricted to any particular form or arrangement, or any specific embodiment disclosed herein, or any specific use, since the same may be modified in various particulars or relations without departing form the spirit or scope of the claimed invention hereinabove shown and described of which the apparatus shown is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. An apparatus to be used in conjunction with a sports rack attached to the roof of a vehicle, the sports rack having at least one elongated hollow rod, the apparatus to be used for retaining a bicycle, comprising:
   a. an upper elongated hollow rod having an exterior cross-section smaller than the interior cross section of the at least one elongated hollow rod of said sports rack and capable of insertion into said at least one elongated hollow rod of sports rack;
   b. the surface of the upper elongated hollow rod having at least one split adjacent one end and capable of having its exterior cross section expanded to a larger cross section at the location of the at least one split;
   c. a plug member located adjacent the end of said upper elongated hollow rod having said at least one split and capable of insertion into said upper elongated hollow rod to thereby increase the cross section of the upper elongated hollow rod at the location of said at least one split;
   d. means for drawing said plug member into said upper elongated hollow rod;
   e. a lower elongated rod rotatably attached to a clamping means at one end, the clamping means having clamps for retaining a bicycle; and
   f. a transverse separation member connecting said upper elongated hollow rod to said lower elongated rod in a manner wherein said lower elongated rod is spaced apart from said upper elongated hollow rod and said clamping means is positioned away from the vehicle when said upper elongated hollow rod is inserted into and retained within said at least one elongated hollow rod of said sports rack;
   g. whereby said upper elongate hollow rod may be inserted into said at least one elongated hollow rod of said sports rack and secured therein by a press fit formed from the expansion of one end of said upper elongated hollow rod when said plug member is caused to be inserted into it, and said clamping means can be attached to a portion of a bicycle for supporting the bicycle.

2. The apparatus in accordance with claim 1 wherein said transverse separation member is located adjacent the end of said upper elongated hollow rod away from the end having said at least one split and is aligned at an angle relative to said upper elongated hollow rod and at an angle relative to said lower elongated rod to thereby cause said lower elongated rod to extend below and away from the upper elongated hollow rod and the clamping means is positioned at the end of said lower elongated rod farthest from the end of said upper elongated hollow rod having the at least one split in its surface.

3. The apparatus in accordance with claim 2 wherein said angle between said upper elongated hollow rod and said transverse separation member is the range of approximately 30 degrees to approximately 60 degrees and the angle between said lower elongated rod and said transverse separation member is in the range of approximately 30 degrees to approximately 60 degrees.

4. The apparatus in accordance with claim 1 wherein the cross-section of said at least one elongated hollow rod of said sports rack is circular, the cross section of said upper elongated hollow rod is circular and said plug member is in the shape of a frustum with the narrow end closest to the end of the upper elongated hollow rod having the at least one split in its surface.

5. The apparatus in accordance with claim 1 wherein said plug member is threaded onto an internal threaded rod extending through the interior of said upper elongated hollow rod and a handle member is attached to the internal threaded rod adjacent to end of said upper elongated hollow rod remote from the end having said at least one split in its surface.

6. The apparatus in accordance with claim 1 wherein said lower elongated rod is hollow, has a threaded rod extending through it, and the threaded rod is attached to a handle adjacent the end of the lower elongated rod closest to the end of said upper elongated hollow rod having the at least one split in its surface and the threaded rod is attached to the clamping means adjacent the end of said lower elongated rod farthest from the end of said upper elongated hollow rod having the at least one split in its surface.

7. An apparatus to be used in conjunction with a sports rack attached to the roof of a vehicle, the sports rack having at least one elongated hollow rod, the apparatus to be used for retaining a bicycle, comprising:
   a. first attachment means for removably attaching the apparatus to the sports rack o said vehicle through insertion of the first attachment means into said at least one elongated hollow rod of said sports rack and removably retaining it therein;
   b. second attachment means for rotatably retaining a clamping means having clamps for retaining a bicycle; and
   c. transverse attachment means by which said first attachment means is connected to said second attachment means in a manner wherein said clamping means is positioned away from the vehicle when said first attachment means is inserted into and retained within said at least one elongated hollow rod of said sports rack.

8. An apparatus in accordance with claim 7 wherein the cross-section of said at least one elongated hollow rod of said sports rack is circular and said first attachment means further comprises:
  a. an upper elongated hollow rod having a generally circular exterior cross-section smaller than the interior cross-section of the at least one elongated hollow rod of said sports rack and capable of insertion into said at least one elongated hollow rod of sports rack;
  b. the surface of the upper elongated hollow rod having at least one split adjacent one end and capable of having its exterior cross-section expanded to a larger cross section at the location of the at least one split;
  c. a plug member located adjacent the end of said upper elongated hollow rod having said at least one split and capable of insertion into said upper elongated hollow rod to thereby increase the cross section of the upper elongated hollow rod at the location of said at least one split; and
  d. means for drawing said plug member into said upper elongated hollow rod.

9. The apparatus in accordance with claim 8 wherein said plug member is in the shape of a frustum with the narrow end closest to the end of the upper elongated hollow rod having the at least one split in its surface.

10. An apparatus in accordance with claim 7 wherein the cross-section of said at least one elongated hollow rod of said sports rack is generally rectangular and said first attachment means further comprises:
  a. an upper elongated hollow rod having a generally rectangular exterior cross-section smaller than the interior cross-section of the at least one elongated hollow rod of said sports rack and capable of insertion into said at least one elongated hollow rod of said sports rack;
  b. the surface of the upper elongated hollow rod adjacent one end which is inserted into said at least one elongated hollow rod of said sports rack capable of having its exterior cross-section expanded to a larger cross section adjacent the location of the end;
  c. two plug members located adjacent the end of said upper elongated hollow rod with one plug member located within the upper elongated hollow rod and the second plug member having a portion outside the upper elongated hollow rod and capable of insertion into said upper elongated hollow rod; and
  d. means for drawing said plug member having a portion outside said upper elongated hollow rod into said upper elongated hollow rod to cause the two plug members to come together and to have at least one of the plug members move transversely relative to the other plug member to thereby increase the cross-section of the upper elongated hollow rod at the location where the plugs spread transversely relative to each other.

11. The apparatus in accordance with claim 10 wherein:
  a. said means for drawing the plug member into the upper elongated hollow rod is an internal threaded rod extending through the interior of said upper elongated hollow rod and threaded into the plug member having a portion outside the upper elongated hollow rod;
  b. said plug member located within the upper elongated hollow rod is hollow and can move relative to the internal threaded rod; and
  c. the internal threaded rod has a handle member attached to the internal threaded rod adjacent to end of said upper elongated hollow rod remote from the location of the two plug members.

12. An apparatus in accordance with claim 7 wherein the cross-section of said at least one elongated hollow rod of said sports rack is generally square and said first attachment means further comprises:
  a. an upper elongated hollow rod having a generally square exterior cross-section smaller than the interior cross section of the at least one elongated hollow rod of said sports rack and capable of insertion into said at least one elongated hollow rod of said sports rack;
  b. the surface of the upper elongated hollow rod adjacent one end which is inserted into said at least one elongated hollow rod of said sport s rack capable of having its exterior cross-section expanded to a larger cross section adjacent the location of the end;
  c. two plug members located adjacent the end of said upper elongated hollow rod with one plug member located within the upper elongated hollow rod and the second plug member having a portion outside the upper elongated hollow rod and capable of insertion into said upper elongated hollow rod; and
  d. means for drawing said plug member having a portion outside said upper elongated hollow rod into said upper elongated hollow rod to cause the two plug members to come together and to have at least one of the plug members move transversely relative to the other plug member to thereby increase the cross-section of the upper elongated hollow rod at the location where the plugs spread transversely relative to each other.

13. The apparatus in accordance with claim 12 wherein:
  a. said means for drawing the plug member into the upper elongated hollow rod is an internal threaded rod extending through the interior of said upper elongated hollow rod and threaded into the plug member having a portion outside the upper elongated hollow rod;
  b. said plug member located within the upper elongated hollow rod is hollow and can move relative to the internal threaded rod; and
  c. the internal threaded rod has a handle member attached to the internal threaded rod adjacent to end of said upper elongated hollow rod remote from the location of the two plug members.

14. An apparatus in accordance with claim 7 wherein the cross section of said at least one elongated hollow rod of said sports rack is generally circular and said first attachment means further comprises:
  a. an upper elongated hollow rod having a generally circular exterior cross-section smaller than the interior cross-section of the at least one elongated hollow rod of said sports rack and capable of insertion into said at least one elongated hollow rod of said sports rack;
  b. the surface of the upper elongated hollow rod adjacent one end which is inserted into said at least one elongated hollow rod of said sports rack capable of having its exterior cross-section expanded to a larger cross section adjacent the location of the end;
  c. two plug members located adjacent the end of said upper elongated hollow rod with one plug member located within the upper elongated hollow rod and the second plug member having a portion outside the upper elongated hollow rod and capable of insertion into said upper elongated hollow rod; and d. means for drawing said plug member having a portion outside said upper elongated hollow rod into said upper elongated hollow rod to cause the two plug members to come together and to have at least one of the plug members move transversely relative to the other plug member to thereby increase the cross-section of the upper elongated hollow rod at the location where the plugs spread transversely relative to each other.

15. The apparatus in accordance with claim 14 wherein:

a. said means for drawing the plug member into the upper elongated hollow rod is an internal threaded rod extending through the interior of said upper elongated hollow rod and threaded into the plug member having a portion outside the upper elongated hollow rod;

b. said plug member located within the upper elongated hollow rod is hollow and can move relative to the internal threaded rod; and c. the internal threaded rod has a handle member attached to the internal threaded rod adjacent to end of said upper elongated hollow rod remote from the location of the two plug members.

16. An apparatus in accordance with claim 7 wherein the cross-section of said at least one elongated hollow rod of said sports rack is generally circular and said first attachment means further comprises:

a. an upper elongated hollow rod having a generally circular exterior cross-section smaller than the interior cross-section of the at least one elongated hollow rod of said sports rack and capable of insertion into said at least one elongated hollow rod of said sports rack;

b. the surface of the upper elongated hollow rod adjacent one end which is inserted into said at least one elongated hollow rod of said sports rack capable of having its exterior cross-section expanded to a larger cross section adjacent the location of the end;

c. three plug members located adjacent the end of said upper elongated hollow rod with two plug members located within the upper elongated hollow rod and the third plug member having a portion outside the upper elongated hollow rod and capable of insertion into said upper elongated hollow rod; and d. means for drawing the third plug member having a portion outside said upper elongated hollow rod into said upper elongated hollow rod to cause the three plug members to come together and to have the two plug members located within the upper elongated hollow rod move transversely relative to each other and relative to the third plug member to thereby increase the cross-section of the upper elongated hollow rod at the location where the plugs spread transversely relative to each other.

17. The apparatus in accordance with claim 16 wherein:

a. said means for drawing the third plug member into the upper elongated hollow rod is an internal threaded rod extending through the interior of said upper elongated hollow rod and threaded into the third plug member having a portion outside the upper elongated hollow rod;

b. the two plug members located within the upper elongated hollow rod are hollow and each can move relative to the internal threaded rod; and c. the internal threaded rod has a handle member attached to the internal threaded rod adjacent to end of said upper elongated hollow rod remote from the location of the three plug members.

18. An apparatus in accordance with claim 7 wherein the cross-section of said at least one elongated hollow rod of said sports rack is generally rectangular and said first attachment means further comprises:

a. an upper elongated hollow rod having a generally rectangular exterior cross-section smaller than the interior cross-section of the at least one elongated hollow rod of said sports rack and capable of insertion into said at least one elongated hollow rod of said sports rack;

b. the surface of the upper elongated hollow rod adjacent one end which is inserted into said at least one elongated hollow rod of said sports rack capable of having its exterior cross-section expanded to a larger cross section adjacent the location of the end;

c. three plug members located adjacent the end of said upper elongated hollow rod with two plug members located within the upper elongated hollow rod and the third plug member having a portion outside the upper elongated hollow rod and capable of insertion into said upper elongated hollow rod; and d. means for drawing the third plug member having a portion outside said upper elongated hollow rod into said upper elongated hollow rod to cause the three plug members to come together and to have the two plug members located within the upper elongated hollow rod move transversely relative to each other and relative to the third plug member to thereby increase the cross-section of the upper elongated hollow rod at the location where the plugs spread transversely relative to each other.

19. The apparatus in accordance with claim 18 wherein:

a. said means for drawing the third plug member into the upper elongated hollow rod is an internal threaded rod extending through the interior of said upper elongated hollow rod and threaded into the third plug member having a portion outside the upper elongated hollow rod;

b. the two plug members located within the upper elongated hollow rod are hollow and each can move relative to the internal threaded rod; and c. the internal threaded rod has a handle member attached to the internal threaded rod adjacent to end of said upper elongated hollow rod remote from the location of the three plug members.

20. An apparatus in accordance with claim 7 wherein the cross-section of said at least one elongated hollow rod of said sports rack is generally square and said first attachment means further comprises:

a. an upper elongated hollow rod having a generally square exterior cross-section smaller than the interior cross-section of the at least one elongated hollow rod of said sports rack and capable of insertion into said at least one elongated hollow rod of said sports rack;

b. the surface of the upper elongated hollow rod adjacent one end which is inserted into said at least one elongated hollow rod of said sports rack capable of having its exterior cross-section expanded to a larger cross section adjacent the location of the end;

c. three plug members located adjacent the end of said upper elongated hollow rod with two plug members located within the upper elongated hollow rod and the third plug member having a portion outside the upper elongated hollow rod and capable of insertion into said upper elongated hollow rod; and d. means for drawing the third plug member having a portion outside said upper elongated hollow rod into said upper elongated hollow rod to cause the three plug members to come together and to have the two plug members located within the upper elongated hollow rod move transversely relative to each other and relative to the third plug member to thereby increase the cross-section of the upper elongated hollow rod at the location where the plugs spread transversely relative to each other.

21. The apparatus in accordance with claim 20 wherein:

a. said means for drawing the third plug member into the upper elongated hollow rod is an internal threaded rod extending through the interior of said upper elongated hollow rod and threaded into the third plug member having a portion outside the upper elongated hollow rod;

b. the two plug members located within the upper elongated hollow rod are hollow and each can move relative to the internal threaded rod; and c. the internal threaded rod has a handle member attached to the internal threaded rod adjacent to end of said upper elongated hollow rod remote from the location of the three plug members.

22. The apparatus in accordance with claim 7 wherein said first attachment means further comprises an upper elongated hollow rod having two ends of which one end is inserted into the elongated hollow rod of the sports rack and the other end remains outside the elongated hollow rod of the sports rack and said transverse attachment means by which said first attachment means is connected to said second attachment means is located adjacent the end of said upper elongated hollow rod outside the elongated hollow rod of the sports rack and is aligned at an angle relative to said upper elongated hollow rod and at an angle relative to said second attachment means to thereby cause said second attachment means to extend below and away from the upper elongated hollow rod and the clamping means is positioned at the end of said second attachment means farthest from the end of said upper elongated hollow rod inserted into the elongated hollow rod of the sports rack.

23. The apparatus in accordance with claim 22 wherein said angle between said upper elongated hollow rod and said transverse separation member is the range of approximately 30 degrees to approximately 60 degrees and the angle between said second attachment means and said transverse separation member is in the range of approximately 30 degrees to approximately 60 degrees.

24. The apparatus in accordance with claim 7 wherein said first attachment means further comprises an upper elongated hollow rod having two ends of which one end is inserted into the elongated hollow rod of the sports rack and the other end remains outside the elongated hollow rod of the sports rack and said second attachment means is an elongated hollow rod having a threaded rod extending through it, and the threaded rod is attached to a handle adjacent the end of the elongated rod closest to the end of said upper elongated hollow rod which is inserted into the elongated hollow rod of the sports rack and the threaded rod is attached to the clamping means adjacent the end of said elongated rod farthest from the end of said upper elongated hollow rod which is inserted into the elongated hollow rod of the sports rack.

* * * * *